Patented Aug. 21, 1945

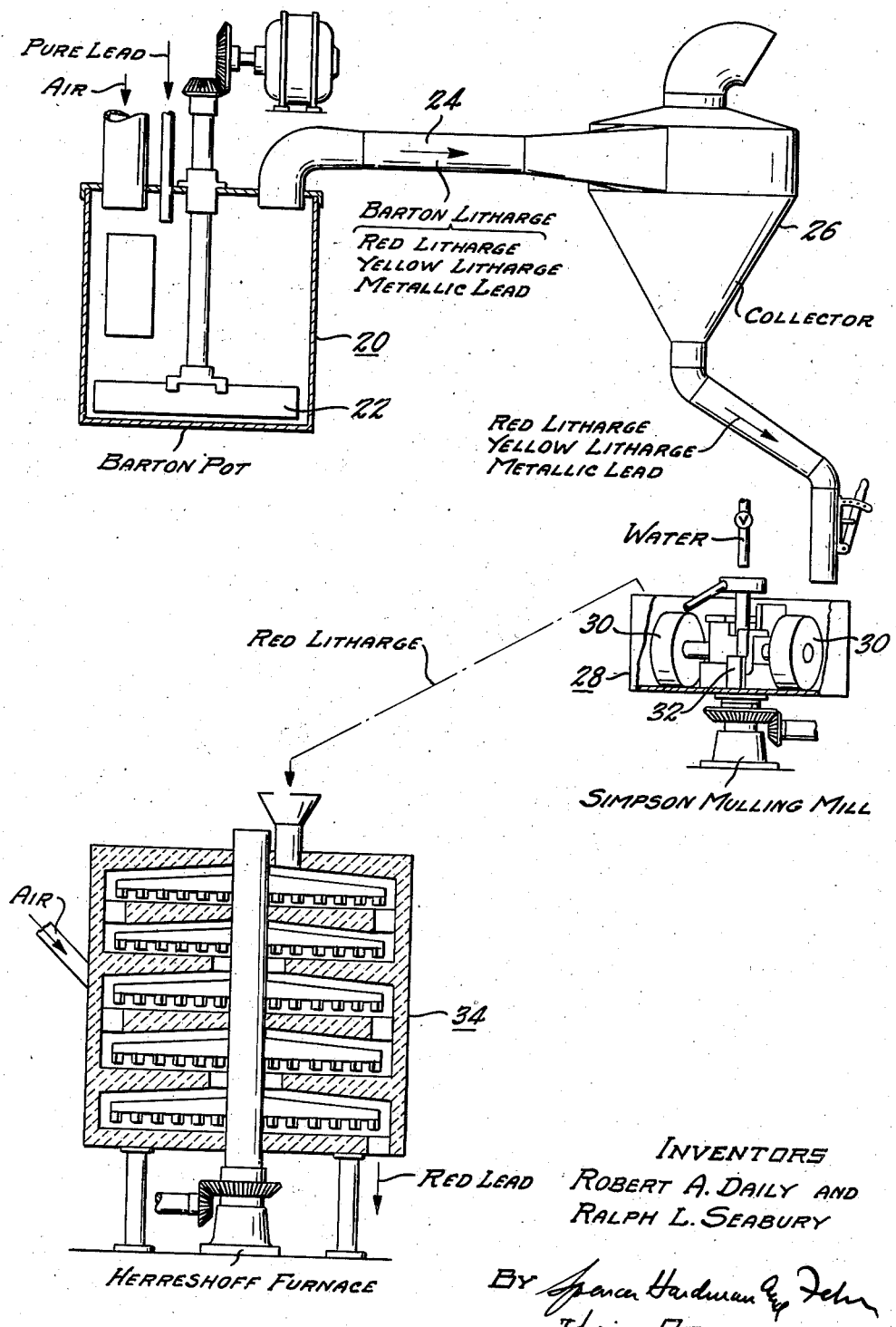

2,383,220

UNITED STATES PATENT OFFICE 2,383,220

MANUFACTURE OF RED LEAD

Ralph L. Seabury and Robert A. Daily, Muncie, Ind., assignors to General Motors Corporation, Detroit, Mich., a corporation of Delaware Application June 24, 1942, Serial No. 448,214

3 Claims. (Cl. 23—146)

This invention relates to the method of making red lead and is particularly concerned with the method of making red lead from the product of a Barton pot.

An object of the invention is to provide a method for making red lead from metallic lead in an economical and expeditious manner.

In carrying out the above object, it is a further object to convert the metallic lead to Barton litharge in the Barton pot and thereafter to convert the Barton litharge to red litharge in a mulling mill, and finally to convert the red litharge to red lead in a Herreshoff furnace.

Another object of the invention is to provide a method of making red lead from red litharge wherein the red litharge is treated under oxidizing conditions at a temperature above 750° F. for causing a conversion of substantially all of the red litharge to red lead.

A still further object is to provide a method of making red lead from metallic lead wherein the metallic lead is converted progressively to red litharge and then to red lead in a three-step process and wherein initial conversion is accomplished by the use of air and heat to form a mixture of yellow litharge and red litharge with small quantities of metallic lead therein after which the mixture is converted to substantially pure red litharge in the presence of air and moisture and finally the red litharge is transformed to red lead at a relatively higher temperature.

Further objects and advantages of the present invention will be apparent from the following description, reference being had to the accompanying drawing wherein a preferred embodiment of the present invention is clearly shown.

In the drawing:

The drawing represents a diagrammatic flow chart of the process wherein the various steps are indicated by the apparatus used to carry out the steps.

Red lead, when manufactured commercially, is usually produced in a reverberatory type of furnace wherein molten lead is oxidized and the oxide coating on the lead bath is periodically removed. This process is slow and relatively inefficient and does not produce as uniform an oxide as is desired.

We have discovered a method for making red lead from metallic lead which is economical and which produces red lead in an expeditious manner and wherein the red lead produced is substantially pure red lead. This process is based on the use of Barton litharge; that is to say, a mixture of red and yellow litharge with some metallic lead, which is a product of the Barton pot. The Barton pot is illustrated diagrammatically at 20 in the drawing and consists of a pot or furnace which contains molten lead at the bottom thereof which may be supplied from a suitable supply means. Heated air is passed into the pot and if sufficient heat is not supplied in this manner, additional external heat may be utilized. A paddle 22 is rotated at a high rate of speed within the pot and tends to whip up the molten lead into a finely divided mist which when contacted by the incoming air is oxidized and is then drawn off from the pot through an exit pipe 24 to a vacuum collector 26 which may be of a cyclone type or any other suitable design. As stated, the product of the Barton pot is termed "Barton litharge" and under normal conditions contains about 37.5% (PbO) yellow litharge and 37.5% (PbO) red litharge with the remainder being pure lead in a finely divided form. The yellow litharge and the red litharge are identical compounds chemically, but are different chrystallographically; the yellow litharge belonging to the orthorhombic system, while the red litharge belongs to the tetragonal system.

The Barton litharge is next agitated preferably in a Simpson type mulling mill or mixer shown at 28. This mill consists of a pair of heavy rolls 30 which have associated therewith scraper blades 32 that constantly scrape the material being mulled into the path of the rolls. Water not in excess of 7% of the total weight of litharge is added to the Barton litharge in the mill. During agitation, the Barton litharge is heated by an exothermic reaction to a temperature between 100° F. and 212° F., whereupon after mulling, which usually requires about 30 minutes, the Barton litharge is transformed to red litharge. During this reaction the metallic lead is partially transformed to red litharge, approximately two-thirds of the metallic lead becoming transformed in the thirty-minute period. The yellow litharge is converted to red litharge in about five minutes. Longer mulling will result in a more complete conversion although thirty minutes is usually sufficient because at this time approximately 92% of the total material is substantially pure red litharge. A Werner-Pfleiderer mixer may be used instead of a Simpson mill with good results.

The product of the Simpson mulling mill is next transferred to a Herreshoff type furnace shown at 34 where it is heated under oxidizing conditions. This furnace is a conventional piece of equipment and the red litharge is fed into the top shelf thereof. We have found that the temperature of conversion should be above 750° F. since at temperatures below this figure the conversion of red litharge to red lead is very slow. The conversion in the Herreshoff furnace requires relatively short periods of time upward to an hour wherein the entire product is substantially pure red lead.

The intermediate step in the Simpson mill, wherein the conversion of substantially all the metallic lead to red litharge is accomplished, is necessary since, if the Barton litharge were fed directly into the Herreshoff furnace, the metallic lead (being in relatively large percentages) would melt at the temperatures involved and ball up the material as well as cause very slow oxidation.

The process as described herein produces red lead in a considerably shorter period of time than has heretofore been required, and likewise provides a more efficient conversion of the lead than in the old type reverberatory furnace. In the step-by-step procedure, it is possible to analyze and control the product at any one stage of the process so that the finished product will be substantially constant in analysis.

We have found the particular apparatus used is of considerable importance. It is possible to convert Barton litharge to red litharge in equipment other than a Simpson mill, but we have found that the conversion is not as rapid as in a Simpson or Werner-Pfleiderer mixer. Therefore, while the use of a Simpson mulling mill or Werner-Pfleiderer type mixer is not entirely necessary to the success of the invention, it does expedite the conversion of the Barton litharge to red litharge. In the conversion from red litharge to red lead other types of equipment may be used with some degree of success, although it is our belief that the conversion will be more complete in a given time period and that the product will be more uniform when using the Herreshoff type furnace.

This application is a continuation-in-part of Patent Number 2,347,131, filed on December 22, 1939.

While the embodiment of the present invention constitutes a preferred type, it is to be understood that other forms may be adopted, all coming within the scope of the claims which follow.

What is claimed is as follows:

1. In a process of making red lead, the steps comprising, making a finely divided mixture of red and yellow litharge together with some free lead by oxidizing molten lead, treating said mixture under suitable conditions for making substantially pure red litharge, and then heating and simultaneously agitating said red litharge in an oxidizing atmosphere at a temperature above 750° F. for a time sufficient to convert all of the red litharge to red lead.

2. In a process of making red lead from lead containing material consisting of a mixture of red and yellow litharge and metallic lead, the steps comprising converting said mixture to red litharge which is free of metallic lead, and then causing said red litharge to be transformed to red lead by agitating the red litharge under oxidizing conditions at a temperature above 750° F. and for a time sufficient to complete the reaction desired.

3. In a method of making red lead, the steps comprising heating and simultaneously agitating substantially pure red litharge which is free of metallic lead at a temperature above 750° F., while in an oxidizing atmosphere for a time sufficient to convert substantially all of the red litharge to red lead.

RALPH L. SEABURY.
ROBERT A. DAILY.